Patented Aug. 16, 1932

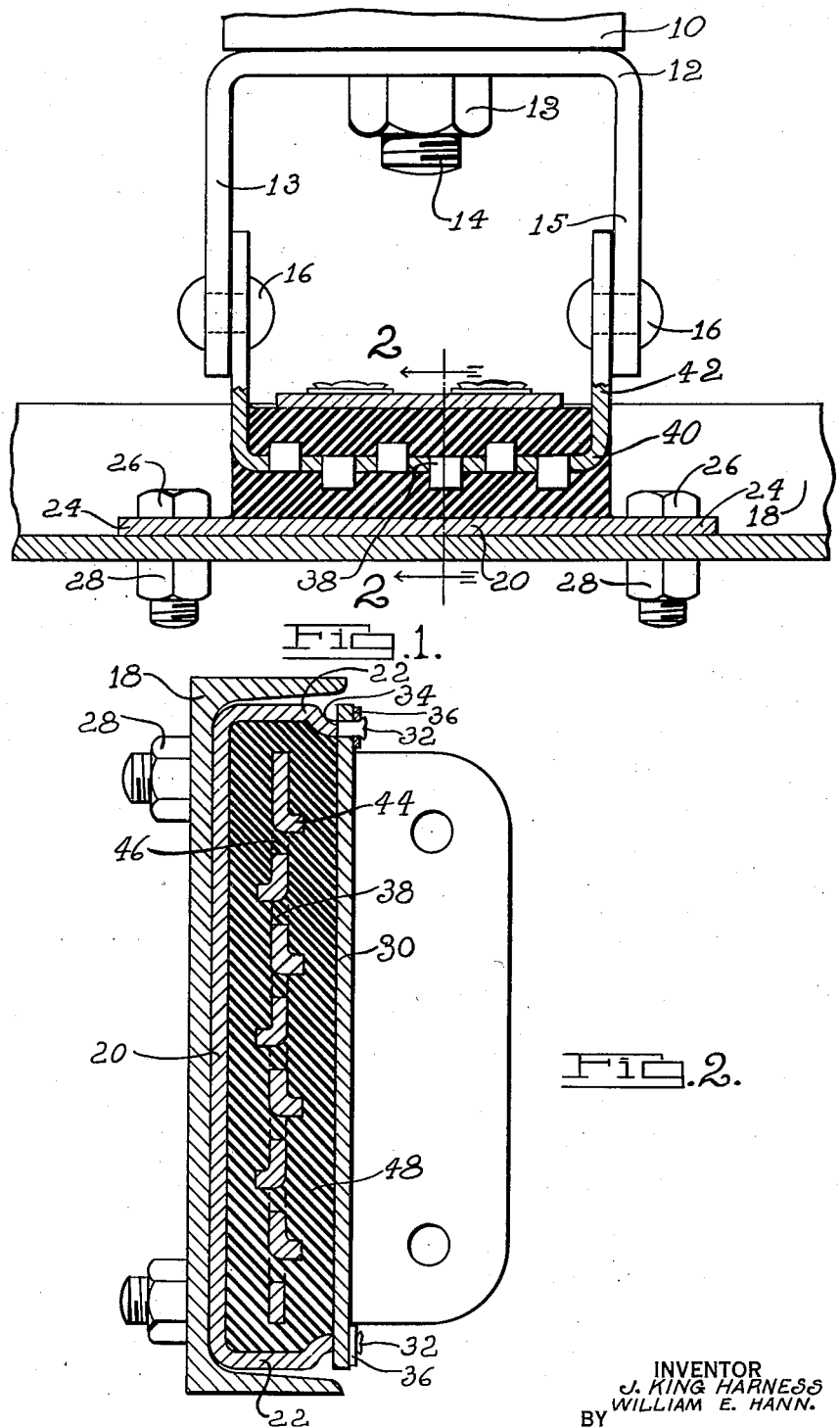

1,872,580

UNITED STATES PATENT OFFICE

J KING HARNESS AND WILLIAM E. HANN, OF DETROIT, MICHIGAN, ASSIGNORS TO CHRYSLER CORPORATION, OF DETROIT, MICHIGAN, A CORPORATION OF DELAWARE

MOTOR MOUNTING

Application filed February 26, 1930. Serial No. 431,570.

This invention relates to a mounting and more particularly to a mounting adapted to dampen out vibrations between a support and a supported member, such as an internal combustion engine mounted in the side frame members of a vehicle chassis.

An object of the invention is to provide an inexpensive mounting, preferably of elastic material, which may be easily assembled or disassembled between an engine and a channel side frame member.

Another object of the invention is to provide a member adapted to be secured to a support and another member adapted to be secured to a part to be supported. A resilient member is adapted to form a resilient connection between the two members, one of said members subjecting the resilient member to tension and the other of said members subjecting the resilient member to compression.

A further object of the invention is to provide spaced members having resilient material therebetween and to embed another member in the resilient material. The outer faces of the resilient material are vulcanized to the adjacent faces of the spaced members and the embedded member is provided with outwardly extending portions. A portion of the resilient material is subjected to compression and another portion of the resilient portion is subjected to tension.

Other objects and advantages of the invention will more fully appear from the following description taken in connection with the accompanying drawing, in which:

Fig. 1 is a sectional view of our improved mounting showing a portion of the chassis side frame member and a portion of an engine supporting arm.

Fig. 2 is a sectional view taken on line 2—2 of Fig. 1.

Referring to the drawing, the reference numeral 10 designates a portion of an outwardly extending arm of an internal combustion engine to which is secured a channel shaped member 12 by a nut 13 screw threaded on a bolt 14. The outwardly extending flanges 15 of the channel 12 are provided with openings to receive attaching means, such as rivets 16, which secure the mounting, hereinafter more fully referred to, to the part to be supported.

A side frame member 18 is shown as the supporting member and is shown as a channel to which the mounting is secured.

In the preferred embodiment of our invention, a plate like member 20 is provided with upper and lower inwardly extending flanges 22 and lateral flanges 24. The lateral flanges are provided with openings for the reception of bolts 26 which extend through the openings and through aligned openings in the channel frame member 18. Nuts 28 are screw threaded on the bolts 26, securely holding the plate like member 20 on the inner surface of the central portion of the frame member 18.

A plate member 30 is spaced from and in overlapping relation with the inner surface of the plate like member 20. The upper and lower portions of the plate 30 are provided with openings which receive projections 32 on the ends of the flanges 22, there being a shoulder 34 against which an inner face of the plate member 30 abuts. The ends of the projections 32, extending beyond the outer surface of the plate 30, may receive pins 36 to hold the plate member 30 against the shoulder 34 or the ends of the projections 32 may be peened over to accomplish the same purpose. The plate like member 20 and the plate 30 form a hollow rectangular member which is secured to the supporting member.

The central portion 38 of a channel shaped member 40 is placed between the inner faces of the hollow rectangular member and outwardly extending flanges 42 are adapted to be secured to the flanges 15 by the securing means 16, shown as rivets. The central portion 38 of the channel 40 is provided with oppositely extending projections 44. These projections are formed by stamping out portions of the metal and bending that portion at right angles to the plane of the central portion, leaving an opening 46.

The central portion 38 is held in spaced relation with respect to the members 20, 30 and 22 while resilient material, such as rubber 48, is molded in the space between the respective members. The outer faces of the rubber 48 are vulcanized to the adjacent faces of the plates 20 and 30.

When the rectangular member is secured to a support and the intermediate channel 40 is secured to a part to be supported, the relative movement of the two members causes the rubber beneath the projections 44 to be compressed. The force of the rubber under compression in this region causes a tension of the rubber adjacent its outer surfaces where it is vulcanized to the spaced plate like members. The member secured to the support subjects the rubber to tension and the member secured to the part to be supported subjects the rubber to compression.

Various changes, including the size, shape and arrangement of parts, may be made without departing from the spirit of our invention and it is our intention to cover by our claims such changes as may be reasonably included within the scope thereof.

We claim:

1. A mounting of the class described comprising, a flat plate like member having a body portion and flanges extending at right angles to said body portion, a flat plate like member having openings receiving the ends of said flanges, the ends of said flanges securing the plate like member to said flanges, a member between said plate like members, rubber embracing said last named member and between said plate like members, and means on one of said plate like members and on the member between said plate-like members for securing one to a support and the other to a member to be supported.

2. A mounting of the class described comprising, plate like members rigidly held in spaced relation, a plate like member having struck out projections extending outwardly from the opposite faces thereof between said spaced plate like members, and rubber embracing said last named member and its projections bonded only to the adjacent faces of said spaced plate like members.

3. A mounting of the class described comprising, members having spaced vertically extending surfaces connecting portions on one of said members for rigidly holding the other of said members, an intermediate member having horizontal faces, and rubber embracing said last named member bonded only to the adjacent vertical faces of said first named members.

J KING HARNESS.
WILLIAM E. HANN.